(12) United States Patent
DiMascio

(10) Patent No.: US 9,446,952 B2
(45) Date of Patent: Sep. 20, 2016

(54) BATCH METHODS FOR PRODUCING CHLORINE DIOXIDE SOLUTIONS

(75) Inventor: Felice DiMascio, Rocky Hill, CT (US)

(73) Assignee: NALCO Company, Naperville, IL (US)

(*) Notice: Subject to any disclaimer, the term of this patent is extended or adjusted under 35 U.S.C. 154(b) by 0 days.

(21) Appl. No.: 11/388,892

(22) Filed: Mar. 24, 2006

(65) Prior Publication Data

US 2006/0216223 A1 Sep. 28, 2006

Related U.S. Application Data

(60) Provisional application No. 60/665,020, filed on Mar. 24, 2005.

(51) Int. Cl.
*C01B 11/02* (2006.01)

(52) U.S. Cl.
CPC ..................... *C01B 11/024* (2013.01)

(58) Field of Classification Search
USPC .......... 423/477; 252/187.21, 187.23–187.28, 252/187.33, 187.34
See application file for complete search history.

(56) References Cited

U.S. PATENT DOCUMENTS

| | | | | |
|---|---|---|---|---|
| 2,071,091 A | * | 2/1937 | Taylor | 424/661 |
| 2,482,891 A | * | 9/1949 | Aston | 252/187.23 |
| 4,104,190 A | * | 8/1978 | Hartshorn | 252/187.21 |
| 4,381,290 A | * | 4/1983 | Hardee et al. | 423/478 |
| 5,324,477 A | * | 6/1994 | Schroeder et al. | 422/37 |
| 5,399,288 A | * | 3/1995 | Marzouk et al. | 252/186.21 |
| 5,622,725 A | * | 4/1997 | Kross | 424/665 |
| 5,631,300 A | * | 5/1997 | Wellinghoff | 514/772.3 |
| 5,707,546 A | * | 1/1998 | Pitochelli | 252/187.21 |
| 5,738,840 A | * | 4/1998 | Richter | 424/53 |
| 6,077,495 A | * | 6/2000 | Speronello et al. | 423/477 |
| 6,602,442 B1 | * | 8/2003 | Pitochelli | 252/187.21 |
| 6,635,230 B2 | * | 10/2003 | Klatte | 423/477 |
| 2001/0012504 A1 | * | 8/2001 | Thangaraj et al. | 423/477 |
| 2002/0014463 A1 | * | 2/2002 | Iverson et al. | 210/749 |
| 2003/0031687 A1 | * | 2/2003 | Falder et al. | 424/400 |
| 2005/0035065 A1 | * | 2/2005 | Martin | 210/753 |
| 2005/0079230 A1 | * | 4/2005 | Lee et al. | 424/661 |
| 2005/0201922 A1 | * | 9/2005 | Kennedy | C01B 11/024 423/477 |
| 2005/0249658 A1 | * | 11/2005 | Tarbet | 423/477 |
| 2006/0197056 A1 | * | 9/2006 | Martin | 252/188.1 |

FOREIGN PATENT DOCUMENTS

WO   WO 03093170 A1 * 11/2003

OTHER PUBLICATIONS

Grant & Hackh's Chemical Dictionary, 1987, pp. 217.*
"Chorine dioxide process", pp. 1-5, no date, taken from http://pplant.uga.edu/tappi/ClO2%20Process.pdf.*
Han et al, "Research on Chlorine Dioxide Gas Technology at Perdue University", p. 1, no date, taken from http://www.cfse.purdue.edu/media/annualreport/chlorinedioxidegas_han.pdf.*

* cited by examiner

*Primary Examiner* — Ngoc-Yen Nguyen
(74) *Attorney, Agent, or Firm* — Eric D. Babych; Brinks Gilson & Lione

(57) ABSTRACT

A process for generating aqueous chlorine dioxide solutions includes adding a solid phase alkali metal chlorite, a solid phase acid, and a solid phase oxidizing agent to an aqueous solution, wherein the solid phase acid ahs a pKa less than 4. Also disclosed are compositions for producing chlorine dioxide solutions.

2 Claims, 1 Drawing Sheet

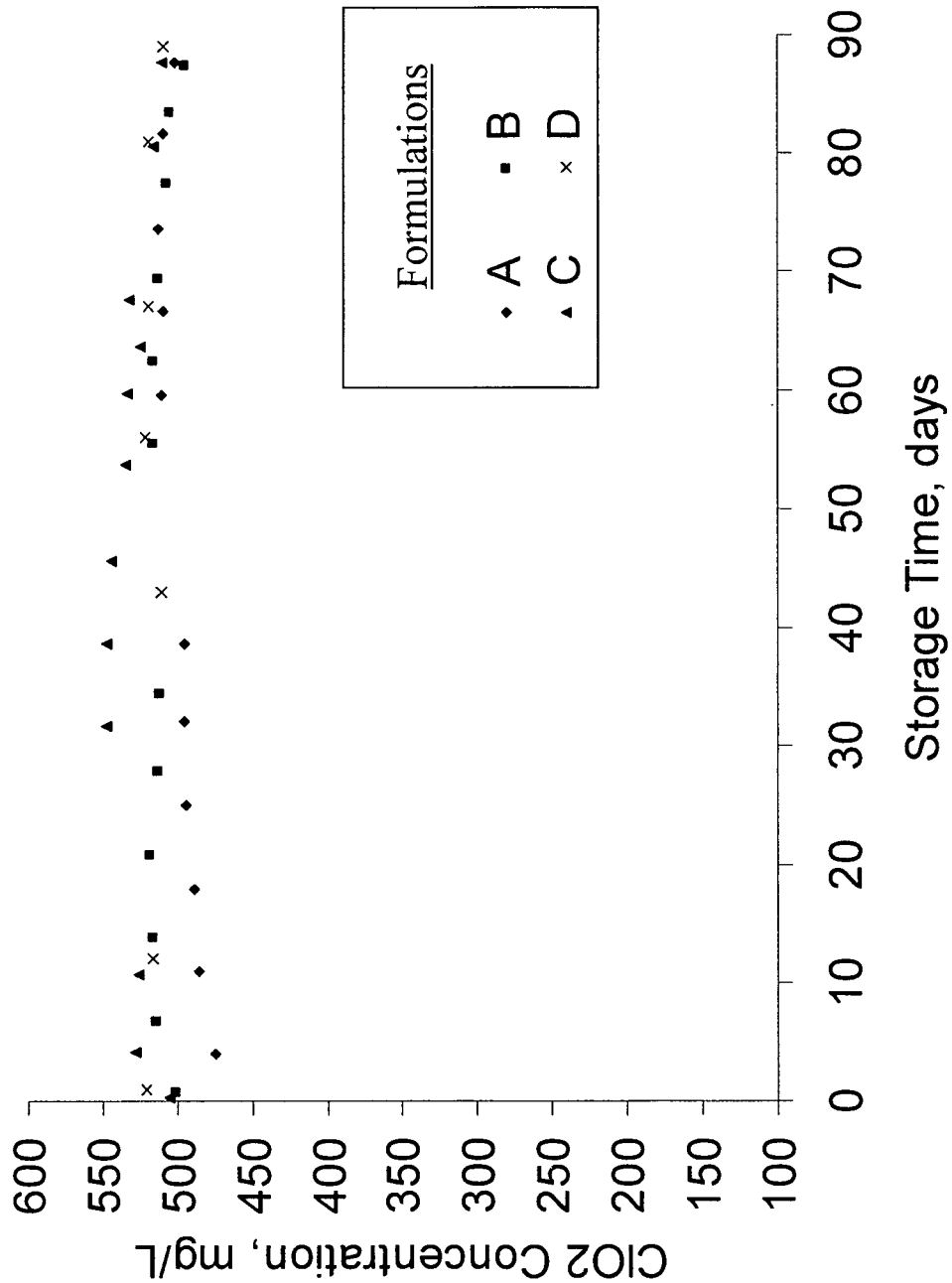

BATCH METHODS FOR PRODUCING CHLORINE DIOXIDE SOLUTIONS

CROSS REFERENCE TO RELATED APPLICATIONS

This application claims the benefit of U.S. Provisional Patent Application No. 60/665,020 filed on Mar. 24, 2005, incorporated herein by reference in its entirety.

BACKGROUND

This disclosure generally relates to methods for generating aqueous chlorine dioxide solutions. More particularly, the disclosure relates to batch production of chlorine dioxide solutions by adding a solid phase alkali metal chlorite, a solid phase acid, and a solid phase oxidizing agent to an aqueous solution.

With the decline of gaseous chlorine as a microbiocide, various alternatives have been explored, including bleach, bleach with bromide, bromo-chlorodimethyl hydantoin, ozone, and chlorine dioxide ($ClO_2$). Of these, chlorine dioxide has generated a great deal of interest for control of microbiological growth in a number of different industries, including the dairy industry, the beverage industry, the pulp and paper industries, the fruit and vegetable processing industries, various canning plants, the poultry industry, the beef processing industry and miscellaneous other food processing applications. Chlorine dioxide is also seeing increased use in municipal potable water treatment facilities and in industrial waste treatment facilities, because of its selectivity towards specific environmentally-objectionable waste materials, including phenols, sulfides, cyanides, thiosulfates, and mercaptans. In addition, chlorine dioxide is being used in the oil and gas industry for downhole applications as a well stimulation enhancement additive.

Unlike chlorine, chlorine dioxide remains a gas when dissolved in aqueous solutions and does not ionize to form weak acids. This property is at least partly responsible for the biocidal effectiveness of chlorine dioxide over a wide pH range. Moreover, chlorine dioxide is a highly effective microbiocide at concentrations as low as 0.1 parts per million (ppm) over a wide pH range.

The biocidal activity of chlorine dioxide is believed to be due to its ability to penetrate bacterial cell walls and react with essential amino acids within the cell cytoplasm to disrupt cell metabolism. This mechanism is more efficient than other oxidizers that "burn" on contact and is highly effective against legionella, algae and amoebal cysts, giardia cysts, coliforms, salmonella, shigella, and cryptosporidium.

Unfortunately, chlorine dioxide in solution is unstable with an extremely short shelf life and thus, is not commercially available. Chlorine dioxide solutions must typically be generated at its point of use such as, for example, by a reaction between a metal chlorate or metal chlorite in aqueous solution and a liquid phase strong acid. However, the use of liquid phase strong acids poses handling issues and safety concerns. In view of this, it would be desirable to develop point of use systems that do not employ liquid acids.

Electrochemical processes provide a means for continuously generating chlorine dioxide for point of use applications. One difficulty with electrochemical processes is that it can be difficult to control the generation of undesirable species. Moreover, the electrochemical processes generally require a power source and an electrochemical apparatus, which can be relatively expensive, can require a large footprint, and can require plumbing configurations with the source to be treated with the chlorine dioxide.

Chlorine dioxide has also been continuously produced from a chlorine dioxide precursor solution by contacting the precursor solution with a catalyst (e.g., catalysts containing a metal such as described for example in U.S. Pat. No. 5,008,096) in the absence of an electrical field or electrochemical cell. However, it has been found that the support materials for the catalytic sites tend to quickly degrade due to the oxidizing nature of chlorine dioxide. Moreover, the continuous processes are not effective for batch production.

Accordingly, there is a need for an economical batch process and composition for generating chlorine dioxide that does not pose safety concerns.

SUMMARY

Disclosed herein are methods and compositions for producing chlorine dioxide solutions and compositions thereof. In one embodiment, a batch process for generating an aqueous solution of chlorine dioxide comprises adding a solid phase alkali metal chlorite salt, a solid phase oxidizing agent and a solid phase acid to an aqueous solution, wherein the solid phase acid has a pKa of less than 4.0; and generating chlorine dioxide in the aqueous solution.

A point of use process for producing a chlorine dioxide solution comprises adding a solid phase alkali metal chlorite salt, a solid phase oxidizing agent consisting of dichlorocyanurate, and a solid phase acid to an aqueous solution, wherein the solid phase acid has a pKa of less than 4; and generating chlorine dioxide in the solution, wherein the chlorine dioxide solution has a concentration that remains substantially the same after a period of 90 days.

In another embodiment, a process for generating chlorine dioxide in solution comprises adding a first solid phase material consisting essentially of an acid and a second solid phase material consisting essentially of a mixture of an alkali metal chlorite and an alkali metal hypochlorite to an aqueous solution; and dissolving the first and second solid phase materials and generating chlorine dioxide in the aqueous solution.

The above described and other features are exemplified by the following FIGURE and detailed description.

BRIEF DESCRIPTION OF THE DRAWINGS

Referring now to the FIGURE, which are exemplary embodiments, and wherein the like elements are numbered alike:

The FIGURE graphically illustrates chlorine dioxide concentration as a function of storage time.

DETAILED DESCRIPTION

Mixing a solid phase alkali metal chlorite salt, a solid phase acid and a solid phase oxidizing agent in an aqueous solution can be used to produce aqueous batch solutions of chlorine dioxide. In some embodiments, a second salt may also be added to the mixture. In still other embodiments, a catalyst can be added to the mixture. In another embodiment, two solid phase materials are combined in an aqueous solution to produce chlorine dioxide. The first solid phase material consisting essentially of an acid. The second solid phase material consisting essentially of a mixture of an alkali metal chlorite and an alkali metal hypochlorite. Preferably, the solid phase materials are substantially non-reactive when in contact with each other while in the solid phase. In some embodiments, the solid phase chlorite salt and solid phase oxidizing agent can be mixed to form one powder prior to addition to an aqueous solution.

In the first embodiment, the solid phase chlorite material is a water-soluble alkali metal chlorite compound. Suitable alkali metals include sodium, potassium, lithium, and the like, with preference given to sodium salt considering its commercial availability. Suitable commercially available chlorite solutions may contain byproducts from the manufacturing process as well as include stabilizing agents for shipping and storage purposes, the selection of which will depend on the intended application. For example, some commercially available alkali metal chlorite solutions may contain small percentages of chlorates, chlorides, hydrogen peroxide, water, hydroxide ions, and the like. Depending on the application, certain governmental regulatory requirements may dictate the maximum allowable limits for these byproducts or agents since commercially available chlorites solutions are not approved for all applications. For example, drinking water applications generally have maximum allowable limits that are substantially lower than, for example, applications related to the pulp and paper industry.

During operation, the solid phase alkali metal chlorite material is diluted by the system. The term "dilute" refers to aqueous alkali metal halite solutions containing less than about 50,000 milligrams alkali metal halite per liter of solution (mg/L).

The solid phase acid can be organic or inorganic and is selected to have an acid ionization constant (pKa) less than 4.0. The negative log of the acid ionization constant (pKa) is defined as the ability of an ionizable group of an organic compound to donate a proton (H$^+$) in an aqueous media. The computed quantity is a measure of its apparent pKa, or macroscopic dissociation constant, at equilibrium, normally taken at 25° C. Preferably, the solid phase organic or inorganic acid has a pKa and is added in an amount effective to adjust the pH of the solution from about 1 to about 3.

Suitable solid phase organic or inorganic acids include, but are not limited to, amidosulfonic acids, aspartic acids, sodium hydrogen sulfate, sodium hydrogen phosphate, potassium hydrogen phthalate, bromoacetic, chloroacetic, citric, glutamic, maleic, malic, oxalic, succinic, sulfamic, sulfuric, tartaric, and the like. Other suitable solid phase acids will be apparent to those skilled in the art in view of this disclosure. The use of solid phase acids, compared to liquids, provide better handling capabilities.

An oxidizing agent is generally defined as a substance that gives up oxygen easily, removes hydrogen from another substance, or attracts electrons. Suitable solid phase oxidizing agents include, but are not limited to, perborates, peroxides, persulfates, peroxydisulfates, permanganate, trichloroisocyanurates, dichloroisocynaurate hypochlorites, hydantoins, perchlorates, chlorates, nitrates, dichromate, and the like. Specific examples that are commercially available include trichloro-s-triazinetrione, trichloro isocyanuric acid, calcium hypochlorite, sodium dichloroisocyanuric acid, sodium dichloroisocyanurate, dichloroisocyanuric acid, sodium/potassium dichromate, sodium/potassium persulfate, sodium/potassium perborate, sodium/potassium perchlorate, sodium/potassium permanganate, among others. Other suitable solid phase oxidizing agents will be apparent to those skilled in the art in view of this disclosure. Where appropriate, the solid phase oxidizing agent can exist in either anhydrous or hydrated forms. Advantageously, compared to liquids, solid phase oxidizing agent materials are relatively safe, are less corrosive, and provide better handling capabilities.

The solid phase oxidizing agents and solid phase acids can be of any size, shape, and geometry as may be desired for a given application including, but not limited to, tablets, pellets, rods, or granules having spherical, cylindrical, or other various polygonal shapes. In addition, regulatory requirements should be taken into consideration when selecting suitable commercial sources since different applications will be governed by different requirements.

In some embodiments, the addition of a soluble salt (in the solid phase) to the solution can advantageously be used to generate an acid in situ and react with the water-soluble chlorite. A salt is the substance formed between the anion of an acid and the cation of a base. An example is sodium chloride (NaCl). When NaCl is added to sodium bisulfate (NaHSO$_4$), a reaction occurs which produces sodium sulfate (Na$_2$SO$_4$) and hydrochloric acid (HCl) as shown below. HCl is a strong acid that is known to react very efficiently with water-soluble chlorite.

$$NaCl + NaHSO_4 \rightarrow Na_2SO_4 + HCl$$

After mixing the various components, the solution is allowed to rest for a period of time effective to generate a desired amount of chlorine dioxide. In addition the particular reactants employed, the amount of time is generally dependent on the temperature of the solution. The time period decreases with increasing solution temperatures.

Optionally, the time period can also be shortened by aid of a 'carrier free' or 'supported' catalyst. The types of acid and oxidizing chemicals used will determine the type of catalyst required. Examples of such catalyst include, but not limited to, the metals, oxides, and salts of the transition-metal (elements found between the Group IIA Elements and the Group IIB Elements in the periodic table), valve-metal (selected from the group consisting of titanium, tantalum, niobium, and alloys thereof), and precious-metal (selected from the group consisting of gold, palladium, platinum, rhodium, iridium, and ruthenium) groups, elements found in Group VIIA Elements in the periodic table (chloride, bromide, fluoride and iodide ions), or a mixture thereof. They may also be present in their ionic form.

The prepared chlorine dioxide solution is then diluted to a concentration from about 0.01 to 25 milligrams per liter (mg/L) of total available chlorine dioxide prior to use. The method for dilution is dependent on the volume of the prepared chlorine dioxide solution. Small volumes can be carefully diluted manually. Some methods for diluting large volumes include, but are not limited to, the use of an eductor, water driven pump, metering pump or the like.

In another embodiment, the process comprises mixing two solid phase materials that when combined in an aqueous solution will generate a chlorine dioxide solution. It is generally desirable to have both solid material with State and Federal registrations and approvals. Solid phase forms are preferred such that accidental mixing of the two materials will not immediately generate chlorine dioxide at hazardous levels.

The first solid phase material is any acid that is regarded as "generally recognized as safe" (GRAS) acid in that the Food and Drug Administration (FDA). The second solid phase material consists of a mixture of alkali metal chlorite and alkali metal hypochlorite. Preferred alkali metal chlorites are sodium or potassium chlorite. A preferred alkali metal hypochlorite is sodium hypochlorite.

Preferred metal chlorite is sodium chlorite solid which is readily available. Preferred metal hypochlorite is sodium hypochlorite, which is only available in liquid form. Calcium hypochlorite is available in solid form, but is not desirable due to its ability to form a calcium salt precipitate as a reaction byproduct.

In order to use sodium hypochlorite, it must be put into a solid form. This can be accomplished by using an inert material desiccant or drying agent. Preferred desiccants include, but not limited to, inert and hydroscopic salts, such as sodium sulfate or potassium chloride. Other suitable supports include, but are not limited to, carboxymethyl cellulose, methylcellulose, lactose, dextrose, and the like.

This disclosure is further illustrated by the following non-limiting examples.

In these examples, which are directed towards the batch production of chlorine dioxide, a properly calibrated Direct Reading Spectrophotometer, Model No. DR/2010, was used to measure the chlorine dioxide concentration (mg/L) in the effluent using Hach Company Method 8138. For calibration, a pure chlorine dioxide solution was prepared and titrated according to Iodometric Method 4500-$ClO_2$ in Standard Methods for the Examinations of Water and Wastewater 20$^{th}$ edition 1998. Before the spectrophotometer was calibrated for $ClO_2$ readings, the U.V. lamp was replaced and the wavelength calibrated according to manufacturer's instructions for calibrating wavelength on 2010 series meters. Using the pure chlorine dioxide solution obtained from method 4500-$ClO_2$, the spectrophotometer was then given a calibration factor where it deviated from the titrated $ClO_2$ concentration.

Measurement of the yield provided a standard for evaluating actual performance of the process/system and was determined in accordance with the following mathematical relationship:

$$\% \text{ Yield} = \frac{\text{actual}}{\text{theoretical}} \times 100$$

wherein the actual yield was obtained from the amount of chlorine dioxide generated, and wherein the theoretical yield was calculated by the amount of chlorine dioxide that could be generated from the concentration of the sodium chlorite in the starting solution. The theoretical yield was calculated using the following mathematical relationship:

$$\% \text{ TheoreticalYield} = \frac{[ClO_2]_{product}}{\left[\frac{X}{Y}\right][NaClO_2]_{feed}}$$

wherein the X is the number of moles of chlorine dioxide produced and Y is the number of moles of chlorite ions required to produce X moles of chlorine dioxide based on the stoichiometry of the particular reaction.

EXAMPLE 1

In this example, various solid phase acids were reacted with an aqueous sodium chlorite solution without the solid phase oxidizer. The protocol consisted of the following: 0.45 grams of sodium chlorite (technical grade) was added to a 500 mL amber bottle containing 450 mL of deionized water at 16° C. The solid acid, at a 1 to 1 molar ratio of hydrogen ion to sodium chlorite, was added to the amber bottle (already containing the sodium chlorite) after 5 minutes. The bottle was securely capped and placed in a room at 16° C. The bottle was agitated gently prior to each concentration and pH measurement at the 1, 2, and 24 hours. The acids evaluated are listed in Table 1.

TABLE 1

| Acid Type | Formula | MW | (rxn) pKa @ 25° C. |
|---|---|---|---|
| Amidosulfonic Acid | $H_3NSO_3$ | 97.10 | 0.996 |
| Oxalic Acid | $C_2H_2O_4$ | 90.04 | (1) 1.23, (2) 4.19 |
| Bromoacetic Acid | $C_2H_3BrO_2$ | 138.95 | 2.69 |
| Chloroacetic Acid | $C_2H_3ClO_2$ | 94.50 | 2.85 |
| Maleic Acid | $C_4H_4O_4$ | 116.07 | (1) 1.83, (2) 6.07 |
| Citric Acid | $C_6H_8O_7$ | 192.13 | (1) 3.14, (2) 4.77, (3) 6.39 |

The expected reaction stoichiometry of the sodium chlorite and the acids is:

$$5NaClO_2 + 4H^+ \rightarrow 4ClO_2 + NaCl + Na^+ + 2H_2O$$

Table 2 displays the results of the reaction of sodium chlorite with the acids after 1, 2 and 24 hours:

TABLE 2

| Acid Type | Yield - 1 hr (%) | Yield - 2 hrs (%) | Yield - 24 hrs (%) |
|---|---|---|---|
| Amidosulfonic Acid | 34.4 | 34.7 | 39.8 |
| Oxalic Acid | 39.8 | 40.1 | 46.2 |
| Bromoacetic Acid | 56.7 | 78.1 | 81.5 |
| Chloroacetic Acid | 39.1 | 40.1 | 45.2 |
| Maleic Acid | 42.5 | 42.8 | 50.4 |
| Citric Acid | 14.1 | 23.1 | 38.3 |

The stoichiometry of equation above (5 $ClO_2^- \rightarrow 4ClO_2$) shows that 20% of the chlorite ions do not produce $ClO_2$, indicating that when all of the chlorite ions are consumed, only 80% is converted to $ClO_2$:

$$\% \text{ Yield} = \frac{[ClO_2]}{\left(\frac{4}{5}\right)[NaClO_2]} \times 100$$

A high conversion efficiency does not result is a high yield. Typically, high concentrations of sodium chlorite and necessarily excess acid are required for high $ClO_2$ conversion and purity.

EXAMPLE 2

In this example, various solid phase oxidizer solid phase acids were reacted with an aqueous sodium chlorite solution without the solid phase acids. The protocol consisted of the following; 0.45 grams of sodium chlorite (technical grade) was added to a 500 mL amber bottle containing 450 mL of deionized water at 16° C. The oxidizer, at a 1 to 1 molar ratio of the sodium chlorite, was added to the amber bottle (already containing the sodium chlorite) after 5 minutes. The bottle was securely capped and placed in a room a 16° C. The bottle was agitated gently prior to each concentration and pH measurement at the 1, 2, 3, 6, and 24 hours. The sold phase oxidizing agents evaluated are listed in Table 3.

TABLE 3

| Oxidizing Chemical Name | Formula | MW |
|---|---|---|
| Sodium Dichloroisocyanurate | $C_3Cl_2N_3NaO_3$ | 219.95 |
| Trichloroisocyanuric Acid | $C_3N_3O_3Cl_3$ | 232.41 |
| Calcium Hypochlorite | $CaCl_2O_2$ | 142.99 |

TABLE 3-continued

| Oxidizing Chemical Name | Formula | MW |
|---|---|---|
| 1,3-Dichloro-5,5-Dimethylhydantoin | $(CH)_3N_2O_2Cl_2$ | 197.02 |
| 1,3-Dibromo-5,5-Dimethylhydantoin | $(CH)_3N_2O_2Br_2$ | 285.93 |

Table 4 displays the reaction of sodium chlorite with the oxidizer after 1, 2, and 24 hours:

TABLE 4

| Oxidizer Type | Yield - 1 hr (%) | Yield - 2 hrs (%) | Yield - 24 hrs (%) |
|---|---|---|---|
| Sodium Dichloroisocyanurate | 18.1 | 55.6 | 65.0 |
| Trichloroisocyanuric Acid | 52.6 | 74.8 | 79.5 |
| Calcium Hypochlorite | 0.8 | 0.8 | 0.8 |
| 1,3-Dichloro-5,5-Dimethylhydantoin | 11.8 | 24.4 | 74.6 |
| 1,3-Dibromo-5,5-Dimethylhydantoin | 16.6 | 34.0 | 65.4 |

The yield % was calculated assuming a stoichiometry of equation of 1 to 1 ($5\ ClO_2^- \rightarrow 5\ ClO_2$), indicating that 100% of the chlorite ions can be converted to $ClO_2$:

$$\%\ \text{Yield} = \frac{[ClO_2]}{[NaClO_2]} \times 100$$

As shown in Table 4, the solution containing the calcium hypochlorite did not generate any significant quantity chlorine dioxide (less than 1% yield) and its pH was extremely high at a value of 11. The chlorine dioxide reaction rate, yield and purity are strongly dependent on the reaction medium pH (and pKa of the solid phase acid). Some oxidizers may contain stabilizing agents that increase the alkalinity (e.g., hydroxyl, bicarbonate, and/or carbonate ions). For example, calcium hypochlorite is typically shipped as $3Ca(OCl)_2 2Ca(OH)_2 3H_2O$, where $Ca(OH)_2$ is calcium hydroxide. $Ca(OH)_2$ must be neutralized with acid in order to lower the pH to optimum conditions. Thus, the yield is expected to increase with increasing solution pH.

EXAMPLE 3

The protocol consisted of the following; 0.45 grams of sodium chlorite (technical grade) was added to a 500 mL amber bottle containing 450 mL of deionized water at 16° C. The oxidizer and acid were added, in amounts that corresponded to the stoichiometry of the corresponding reaction, to the amber bottle (already containing the sodium chlorite) after 5 minutes. The bottle was securely capped and placed in a room a 16° C. The bottle was agitated gently prior to each concentration and pH measurement at the 1, 2, 3, 6, and 24 hours. All of the oxidizers were evaluated with each of the acids; amidosulfonic, oxalic, bromoacetic, chloroacetic, maleic, and citric acids. Table 5 shows the oxidizer and chemical reactions evaluated.

TABLE 5

| Oxidizer/Reaction |
|---|
| Sodium Dichloroisocyanurate |
| $4\ NaClO_2 + C_3Cl_2N_3NaO_3 + 2\ H^+ \rightarrow$ $4\ ClO_2 + 2\ NaCl + 2\ Na^+ + C_3N_3O_3NaH_2$ Trichloroisocyanuric Acid |

TABLE 5-continued

| Oxidizer/Reaction |
|---|
| $6\ NaClO_2 + C_3N_3O_3Cl_3 + 3\ H^+ \rightarrow$ $6\ ClO_2 + 3\ Na^+ + 3\ NaCl + C_3N_3O_3H_3$ Calcium Hypochlorite |
| $4\ NaClO_2 + CaCl_2O_2 + 4\ H^+ \rightarrow$ $4\ ClO_2 + 4\ Na^+ + 2\ CaCl_2 + 2\ H_2O$ 1,3-Dichloro-5,5-Dimethylhydantoin |
| $4\ NaClO_2 + (CH)_3N_2O_2Br_2 + 2\ H^+ \rightarrow$ $4\ ClO_2 + 2\ Na^+ + 2\ NaBr + (CH)_3N_2O_2H_2$ 1,3-Dibromo-5,5-Dimethylhydantoin |
| $4\ NaClO_2 + (CH)_3N_2O_2Cl_2 + 2\ H^+ \rightarrow$ $4\ ClO_2 + 2\ NaCl + 2\ Na^+ + (CH)_3N_2O_2H_2$ |

Tables 6 to 10 show the results of the reaction of sodium chlorite with the acid and oxidizer after 1, 2, and 24 hours:

TABLE 6

| Sodium Dichloroisocyanurate | Yield - 1 hr (%) | Yield - 2 hrs (%) | Yield - 24 hrs (%) |
|---|---|---|---|
| Amidosulfonic Acid | 5.4 | 9.7 | 28.5 |
| Oxalic Acid | 83.0 | 100.0 | 99.9 |
| Bromoacetic Acid | 32.6 | 61.5 | 88.1 |
| Chloroacetic Acid | 31.5 | 66.6 | 98.5 |
| Maleic Acid | 98.5 | 100.0 | 97.8 |
| Citric Acid | 32.2 | 57.9 | 78.7 |

TABLE 7

| Trichloroisocyanuric Acid | Yield - 1 hr (%) | Yield - 2 hrs (%) | Yield - 24 hrs (%) |
|---|---|---|---|
| Amidosulfonic Acid | 6.5 | 12.4 | 42.2 |
| Oxalic Acid | 33.8 | 39.4 | 75.0 |
| Bromoacetic Acid | 30.3 | 37.1 | 77.0 |
| Chloroacetic Acid | 20.7 | 27.5 | 66.0 |
| Maleic Acid | 11.1 | 19.3 | 68.3 |
| Citric Acid | 21.1 | 29.1 | 60.7 |

TABLE 8

| Calcium Hypochlorite | Yield - 1 hr (%) | Yield - 2 hrs (%) | Yield - 24 hrs (%) |
|---|---|---|---|
| Amidosulfonic Acid | 6.4 | 11.8 | 31.1 |
| Oxalic Acid | * | * | * |
| Bromoacetic Acid | 60.9 | 61.3 | 61.9 |
| Chloroacetic Acid | 53.6 | 55.8 | 56.6 |
| Maleic Acid | 35.0 | 35.6 | 41.9 |
| Citric Acid | 53.0 | 55.8 | 62.4 |

* Solution was too cloudy to obtain an accurate reading

TABLE 9

| 1,3-Dichloro-5,5-Dimethylhydantoin | Yield - 1 hr (%) | Yield - 2 hrs (%) | Yield - 24 hrs (%) |
|---|---|---|---|
| Amidosulfonic Acid | 5.8 | 10.7 | 39.5 |
| Oxalic Acid | 33.2 | 36.4 | 51.5 |
| Bromoacetic Acid | 23.8 | 29.3 | 72.5 |
| Chloroacetic Acid | 18.7 | 25.2 | 40.9 |
| Maleic Acid | 16.9 | 19.7 | 51.3 |
| Citric Acid | 24.6 | 29.3 | 47.0 |

TABLE 10

| 1,3-Dibromo-5,5-Dimethylhydantoin | Yield - 1 hr (%) | Yield - 2 hrs (%) | Yield - 24 hrs (%) |
|---|---|---|---|
| Amidosulfonic Acid | 88.5 | 95.0 | 94.3 |
| Oxalic Acid | 99.9 | 97.8 | 91.1 |
| Bromoacetic Acid | 83.0 | 99.9 | 99.9 |
| Chloroacetic Acid | 66.8 | 99.9 | 99.9 |
| Maleic Acid | 39.1 | 60.7 | 89.3 |
| Citric Acid | 71.7 | 99.9 | 99.9 |

The yield % was calculated according to the stoichiometry of the respective equation in Table 5:

$$\% \text{ Yield} = \frac{[ClO_2]}{[NaClO_2]} \times 100$$

The highest performance was seen with the halogenated acids.

EXAMPLE 4

The protocol consisted of the following: The acid and salt were added to a 500 mL amber bottle containing 450 mL of deionized water at 16° C. 0.45 grams of sodium chlorite (technical grade) was added to the amber bottle (already containing the acid and salt) after 5 minutes. The bottle was securely capped and placed in a room a 16° C. The bottle was agitated gently prior to each concentration and pH measurement at the 1, 2, 3, 6, and 24 hours. Sodium hydrogen sulfate and potassium hydrogen sulfate were selected as the acids. They were evaluated with sodium chloride as the salt source. The amount of acid and salt added was added, based on the stoichiometry of the reaction, such that the ratio of sodium chlorite and hydrochloric acid produced was approximately 1:1. Table 11 shows the acids and chemical reactions evaluated.

TABLE 11

Acid and Salt/Reaction

Sodium Hydrogen Sulfate

4 NaHSO$_4$ + 4 NaCl → 4 HCl + 4 Na$_2$SO$_4$
5 NaClO$_2$ + 4 HCl → 4 ClO$_2$ + 5 NaCl + 2 H$_2$O

Potassium Hydrogen Sulfate

4 KHSO$_4$ + 4 NaCl → 4 HCl + 2 K$_2$SO$_4$ + 2 Na$_2$SO$_4$
5 NaClO$_2$ + 4 HCl → 4 ClO$_2$ + 5 NaCl + 2 H$_2$O

Tables 12 show the results of the reaction of sodium chlorite with the acid and salt after 1, 2, and 24 hours:

TABLE 12

| Acid | Yield - 1 hr (%) | Yield - 2 hrs (%) | Yield - 24 hrs (%) |
|---|---|---|---|
| Sodium Hydrogen Sulfate | 1.3 | 3.1 | 22.7 |
| Sodium Hydrogen Sulfate w/NaCl | 2.1 | 5.1 | 36.6 |
| Potassium Hydrogen Sulfate | 4.4 | 6.3 | 23.8 |
| Potassium Hydrogen Sulfate w/NaCl | 7.3 | 10.5 | 39.7 |

The yield % was calculated according to the stoichiometry of the respective equation in Table 11:

$$\% \text{ Yield} = \frac{[ClO_2]}{[NaClO_2]} \times 100$$

The reactants in the first reaction in Table 11 will produce hydrochloric acid (HCl). The production of HCl is relatively fast and it typically takes less than 20 seconds at 20° C. The HCl reacts with the NaClO$_2$ following the second reaction in Table 11. The addition of sodium chloride showed a conversion increase of approximately 60%. Because this is the typical chlorite/hydrochloric acid system, an excess of HCl, such as 3:1 HCl to NaClO$_2$, may be required to achieve high conversion and purity. This will convert NaClO$_2$ to ClO$_2$ in a strong HCl medium (acidic disproportionation).

EXAMPLE 5

The protocol consisted of the following; 0.45 grams of sodium chlorite (technical grade) was added to a 500 mL amber bottle containing 450 mL of deionized water at 16° C. The oxidizer and catalyst, in the form of silver sulfate, were added to the amber bottle (already containing the sodium chlorite) after 5 minutes. The bottle was securely capped and placed in a room a 16° C. The bottle was agitated gently prior to each concentration and pH measurement at the 1, 2, 3, 6, and 24 hours. Sodium peroxydisulfate, and potassium peroxydisulfate were selected as the oxidizers. They were evaluated with silver (Ag), in the form of silver sulfate, as the transition-metal catalyst in its ionic form. The amount of oxidizer added corresponded to the stoichiometry of the reaction (2:1 ratio sodium chlorite to oxidizer) and the amount of Ag catalyst was at a 1:1265 molar ratio with respect to sodium chlorite. Table 13 shows the chemical reactions evaluated.

TABLE 13

Oxidizer and Catalyst/Reaction

Sodium Peroxydisulfate (w/Ag as a catalyst in its ionic form)

2 NaClO$_2$ + Na$_2$S$_2$O$_8$ → 2 ClO$_2$ + 2 Na$_2$SO$_4$

Potassium Peroxydisulfate (w/Ag as a catalyst in its ionic form)

2 NaClO$_2$ + K$_2$S$_2$O$_8$ → 2 ClO$_2$ + 2 K$_2$SO$_4$

Table 14 displays the reaction of sodium chlorite with the oxidizer and Ag catalyst after 1, 2, and 24 hours:

TABLE 14

| Oxidizer Type | Yield - 1 hr (%) | Yield - 2 hrs (%) | Yield - 24 hrs (%) |
|---|---|---|---|
| Sodium Peroxydisulfate | 3.6 | 6.0 | 13.8 |
| Sodium Peroxydisulfate Silver Sulfate | 3.8 | 6.5 | 20.9 |
| Potassium Peroxydisulfate | 2.0 | 4.8 | 16.2 |
| Potassium Peroxydisulfate Silver Sulfate | 2.0 | 5.1 | 21.3 |

The yield % was calculated according to the stoichiometry of the respective equation in Table 13:

$$\% \text{ Yield} = \frac{[ClO_2]}{[NaClO_2]} \times 100$$

Although positive, the effect of the Ag catalyst was minimal, approximately 6%. The amount of Ag added was limited by its solubility as a chloride compound. The technical grade sodium chlorite contains of 20% sodium chloride. The solubility of silver chloride (AgCl) is approximately 2 mg/L at 15° C. Therefore, when using a catalyst in its ionic form, its solubility as various compounds must be considered.

The selection of the catalyst may not only be beneficial to the reaction, but also to the potency of the product. As known, chlorine dioxide is a superior disinfectant. Silver ions in a chlorine dioxide solution may provide good benefit with respect to disinfection. Silver ions bond to various parts of the cell, such as the DNA and RNA, cellular proteins, and respiratory enzymes, causing all life support systems in the cell to be immobilized. As a result, there is no more cellular growth or cell division, causing bacteria to no longer multiply and eventually die out. The ions remain active until a microorganism absorbs them. It was for this reason why silver was selected as the catalyst. It must be noted that the maximum permissible concentration of chlorine dioxide ands silver for disinfection of potable water is 0.8 and 0.1 mg/L.

EXAMPLE 6

The protocol consisted of the following; 0.45 grams of sodium chlorite (technical grade) was added to a 500 mL amber bottle containing 450 mL of deionized water at 16° C. Citric acid was selected as the acid, sodium dichloroisocyanurate as the oxidizer and chloride ion, in the form of sodium chloride (NaCl) or potassium chloride (KCl), as the catalyst. The oxidizer, acid, and catalyst were added to the amber bottle (already containing the sodium chlorite) after 5 minutes. The amount acid and oxidizer added of each bottle was 17.51 grams and 77 milligrams, respectively. A total of three solutions were prepared; one containing 5.34 grams of NaCl, the second with 6.81 grams of KCl, and the last with no addition (used as the reference). The bottle was securely capped and placed in a room a 16° C. The bottle was agitated gently prior to the concentration and pH measurement at 1 hour. Table 15 shows the results of the experiment.

TABLE 15

| Acid, Oxidizer, and Catalyst Added to Sodium Chlorite | Yield - 1 hr (%) |
|---|---|
| Citric Acid Sodium Dichloroisocyanurate | 36.8 |
| Citric Acid Sodium Dichloroisocyanurate Sodium Chloride | 92.1 |
| Citric Acid Sodium Dichloroisocyanurate Potassium Chloride | 90.5 |

The amount of sodium dichloroisocyanurate added was only 35% of the stoichiometric amount in the first equation in Table 5. This reaction has a stoichiometry of 1 to 1 (5 $ClO_2^- \rightarrow 5\ ClO_2$), indicating that 100% of the chlorite ions can be converted to $ClO_2$. The citric acid reacted with the remaining portion sodium chlorite. The stoichiometry of this equation is 5 to 4 (5 $ClO_2^- \rightarrow 4\ ClO_2$), indicating 20% of the chlorite ions do not produce $ClO_2$. Therefore, the yield was calculated as follows:

$$\% \text{ Yield} = \frac{[ClO_2]}{\left(\frac{4.35}{5}\right)[NaClO_2]} \times 100$$

The significant increase in conversion is associated with the catalytic effect of chloride ion on chlorine dioxide generation.

EXAMPLE 7

In this example, several chlorine dioxide solutions were prepared in 500 mL amber bottles according to the procedure described in the above examples. The quantity of each reactant is listed in Table 16. The bottles were filled to approximately 90% of their volume capacity and stored at ambient temperature (i.e., about 72° F.). The chlorine dioxide concentration in each bottle was monitored spectrophotometrically once a week for 90 days to determine chlorine dioxide stability over time. These results are shown graphically in FIG. 1.

TABLE 16

Quantity of Reactants in the Making the Chlorine Dioxide Solutions

| | A | B | C | D |
|---|---|---|---|---|
| Sodium Chlorite, g | 0.453 | 0.453 | 0.453 | 0.453 |
| Maleic Acid, g | 0.454 | 0.442 | — | — |
| Sodium Bisulfate, g | — | 0.229 | 0.519 | — |
| Tartaric Acid, g | — | — | — | 1.991 |
| Sodium Dichloroisocyanurate, g | 0.198 | 0.198 | 0.220 | 0.198 |

It has been found, as shown by the data trend in FIG. 1, that as time increased the chlorine dioxide stability was fairly constant for all samples throughout the 90-day storage period.

In this stability evaluation, tartaric acid was used. Tartaric acids is advantageously "generally recognized as safe" (GRAS) acid, in that the Food and Drug Administration (FDA) allows this acid to be used as a food additive. Other GRAS acids include hydrochloric, phosphoric, malic, citric, succinic, sulfamic, and sulfuric acids.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A batch process for generating an aqueous solution of chlorine dioxide, the process consisting of:
    adding a composition consisting of a solid phase oxidizer to an aqueous solution consisting of water and sodium chlorite;
    agitating the aqueous solution; and
    generating chlorine dioxide in the aqueous solution, wherein the solid phase oxidizer is selected from the group consisting of 1,3-dichloro-5,5-dimethylhydantoin and for twenty four hours.

2. The process of claim 1, wherein the aqueous solution is at 16° C.

* * * * *